US011835771B2

(12) United States Patent
Chen et al.

(10) Patent No.: US 11,835,771 B2
(45) Date of Patent: Dec. 5, 2023

(54) OPTICAL FIBER MOUNTING MECHANISM AND PROJECTION DEVICE HAVING THE SAME

(71) Applicant: DELTA ELECTRONICS, INC., Taoyuan (TW)

(72) Inventors: Ching-Chao Chen, Taoyuan (TW); Chia-Sheng Yeh, Taoyuan (TW); Wei-Kuang Ying, Taoyuan (TW); Fu-Jen Chiang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/371,128

(22) Filed: Jul. 9, 2021

(65) Prior Publication Data

US 2022/0137302 A1    May 5, 2022

Related U.S. Application Data

(60) Provisional application No. 63/108,446, filed on Nov. 2, 2020.

(30) Foreign Application Priority Data

Feb. 5, 2021 (CN) .......................... 202110163756.8

(51) Int. Cl.
*G02B 6/38* (2006.01)
*G03B 21/00* (2006.01)

(52) U.S. Cl.
CPC ......... *G02B 6/3817* (2013.01); *G02B 6/3825* (2013.01); *G02B 6/3893* (2013.01); *G03B 21/005* (2013.01)

(58) Field of Classification Search
CPC .................................. G02B 6/38; G02B 21/00
See application file for complete search history.

(56) References Cited

U.S. PATENT DOCUMENTS

| 4,620,266 | A | | 10/1986 | Baumann et al. |
| 5,113,467 | A | | 5/1992 | Peterson et al. |
| 5,671,311 | A | * | 9/1997 | Stillie .................. G02B 6/4261 385/60 |
| 6,017,227 | A | * | 1/2000 | Cairns .................. G02B 6/3816 439/138 |

(Continued)

FOREIGN PATENT DOCUMENTS

| CN | 102319704 A | * | 1/2012 |
| CN | 103595479 A | | 2/2014 |

(Continued)

*Primary Examiner* — Kaveh C Kianni
(74) *Attorney, Agent, or Firm* — CKC & Partners Co., LLC (57) ABSTRACT

An optical fiber mounting mechanism includes an optical fiber, a signal circuit, and a mounting structure. The optical fiber extends along a first direction. The signal circuit extends along the first direction. The mounting structure is disposed at ends of the optical fiber and the signal circuit. The mounting structure surrounds the optical fiber and the signal circuit. The mounting structure has an installation portion. The installation portion extends radially relative to the first direction as the axis direction. The installation portion has a plurality of elements. The elements are exposed from a surface of the installation portion. The surface has a normal direction parallel with the first direction.

14 Claims, 10 Drawing Sheets

(56) References Cited

U.S. PATENT DOCUMENTS

| | | | |
|---|---|---|---|
| 6,652,155 B2 | 11/2003 | Lampert | |
| 10,721,000 B2 * | 7/2020 | Masarik | ................ G02B 6/4212 |
| 2013/0002193 A1 * | 1/2013 | Aldana | ................. G06F 1/1632 |
| | | | 320/107 |
| 2018/0039163 A1 * | 2/2018 | Halsey | ................... G02B 13/02 |

FOREIGN PATENT DOCUMENTS

| | | | | |
|---|---|---|---|---|
| CN | 105629399 A | 6/2016 | | |
| CN | 205721034 U | 11/2016 | | |
| CN | 107515508 A | 12/2017 | | |
| CN | 105455766 B | 7/2018 | | |
| CN | 110701503 A | 1/2020 | | |
| TW | M478163 U | 5/2014 | | |
| TW | M571978 U | 12/2018 | | |
| WO | WO-0197511 A1 * | 12/2001 | ............... H04N 5/38 | |
| WO | WO-2005065738 A2 * | 7/2005 | ......... A61B 5/04001 | |

* cited by examiner

OPTICAL FIBER MOUNTING MECHANISM AND PROJECTION DEVICE HAVING THE SAME

CROSS-REFERENCE TO RELATED APPLICATION

This application claims priority to China Application Serial Number 202110163756.8, filed Feb. 5, 2021, and U.S. Provisional Application Ser. No. 63/108,446, filed Nov. 2, 2020, which are herein incorporated by references in their entirety.

BACKGROUND

Field of Invention

The present invention relates to an optical fiber mounting mechanism, especially a projection device employing the optical fiber mounting mechanism to connect a projection module and a light source module.

Description of Related Art

Application requirement of the optical fiber in the projection system are increased gradually. The light transmission property and the flexible property of the optical fiber make the projection system be more flexible. The projection system includes an imaging system and a light source system that are isolated with each other, and the optical fiber may connected with the imaging system and the light source system that are isolated with each other so as to transmit the light. However, the design of the linked switch of the optical fiber mounting mechanism and the light source module may have the possibility for light leakage. For example, when the optical fiber is removed from the light source module or the projection module, the light source is still turned on such that the light may leak and it may cause dangerous application.

Accordingly, it is still a development direction for the industry to provide an optical fiber mounting mechanism that may prevent light leakage.

SUMMARY

One aspect of the present disclosure is an optical fiber mounting mechanism.

In some embodiments, the optical fiber mounting mechanism includes an optical fiber extending along a first direction, a signal circuit extending along the first direction, and a mounting structure disposed at ends of the optical fiber and the signal circuit. The mounting structure surrounds the optical fiber and the signal circuit. The mounting structure includes an installation portion extending radially relative to the first direction as an axis direction. The installation portion includes a plurality of elements exposed from a surface of the installation portion, and the surface includes a normal direction parallel with the first direction.

In some embodiments, the elements of the installation portion include a plurality of signal contacts connecting with the signal circuit, and the signal contacts extend along the first direction.

In some embodiments, the elements of the installation portion include a magnetic element.

In some embodiments, the elements of the installation portion include a positioning structure protruding from the installation portion along the first direction.

In some embodiments, the elements of the mounting portion include a locking element penetrates the installation portion along the first direction and protruding from the surface of the installation portion.

Another aspect of the present disclosure is a projection device.

In some embodiments, the projection device includes a plurality of optical fiber mounting mechanism, at least one light source module, and at least one projection module. Each of the optical fiber mounting mechanism includes an optical fiber extending along a first direction, a signal circuit extending along the first direction, and a mounting structure disposed at ends of the optical fiber and the signal circuit. The mounting structure surrounds the optical fiber and the signal circuit. The mounting structure includes an installation portion extending radially relative to the first direction as an axis direction, the installation portion includes a plurality of elements exposed from a surface of the installation portion, and the surface includes a normal direction parallel with the first direction. The light source module includes a butting portion, and the butting portion is configured to butt with an installation portion of one of the optical fiber mounting mechanisms along the first direction. The projection module includes a butting portion, and the butting portion is configured to butt with an installation portion of another one of the optical fiber mounting mechanisms along the first direction.

In some embodiments, each of the butting portions includes a plate and a receiving chamber, the plate extends radially relative to the first direction as an axis direction, and the receiving chamber is recessed along the first direction.

In some embodiments, the elements of each of the installation portion include a plurality of signal contacts connecting with the signal circuit of each of the installation portion, each of the butting portions include a plurality of contacts, the contacts are configured to be electrically connected with the signal contacts along the first direction, and a depth of the receiving chamber is greater than an effective contact distance between the contacts and the signal contacts.

In some embodiments, the elements of each of the installation portion include a magnetic element, each of the butting portions includes a magnetic sensing switch, the magnetic sensing switches are configured to connect with the magnetic elements along the first direction, and a depth of the receiving chamber is greater than an effective sensing distance between the magnetic sensing switches and the magnetic elements.

In some embodiments, each of the butting portions includes a plurality of signal contacts and a magnetic sensing switch, and the contacts are electrically connected with the magnetic sensing switch of each of the butting portions.

In some embodiments, the elements of each of the installation portion include a positioning structure, each of the butting portions includes a positioning structure, and the positioning structure of the butting portion and the positioning structure of the installation portion are configured to mate along the first direction.

In some embodiments, the elements of each of the installation portion include a locking element, each of the butting portions includes a locking hole, and the locking hole of the butting portion is configured to connect with the locking element of the installation portion along the first direction.

In some embodiments, a number of the light source module is plural.

In some embodiments, a number of the projection module is plural.

In some embodiments, a number of the light source module is plural, and a number of the projection module is plural.

In the aforementioned embodiments, the optical fiber mounting mechanism of the present disclosure may guarantee that the power switch has been turned off before the optical fiber mounting mechanism is completely removed from the receiving chamber by making the depth of the receiving chamber (or the length of the engaging section of the optical fiber) greater than the effective contact distance between the signal contacts and the contacts and/or the effective sensing distance between the magnetic sensing switch and the magnetic element. Similarly, since the depth of the receiving chamber is greater than the effective contact distance between the signal contacts and the contacts and/or the effective sensing distance between the magnetic sensing switch and the magnetic element, it is guaranteed that the power switch has been turned off before the optical fiber mounting mechanism is completely removed from the receiving chamber. As such, no light will be leaked to cause damage.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
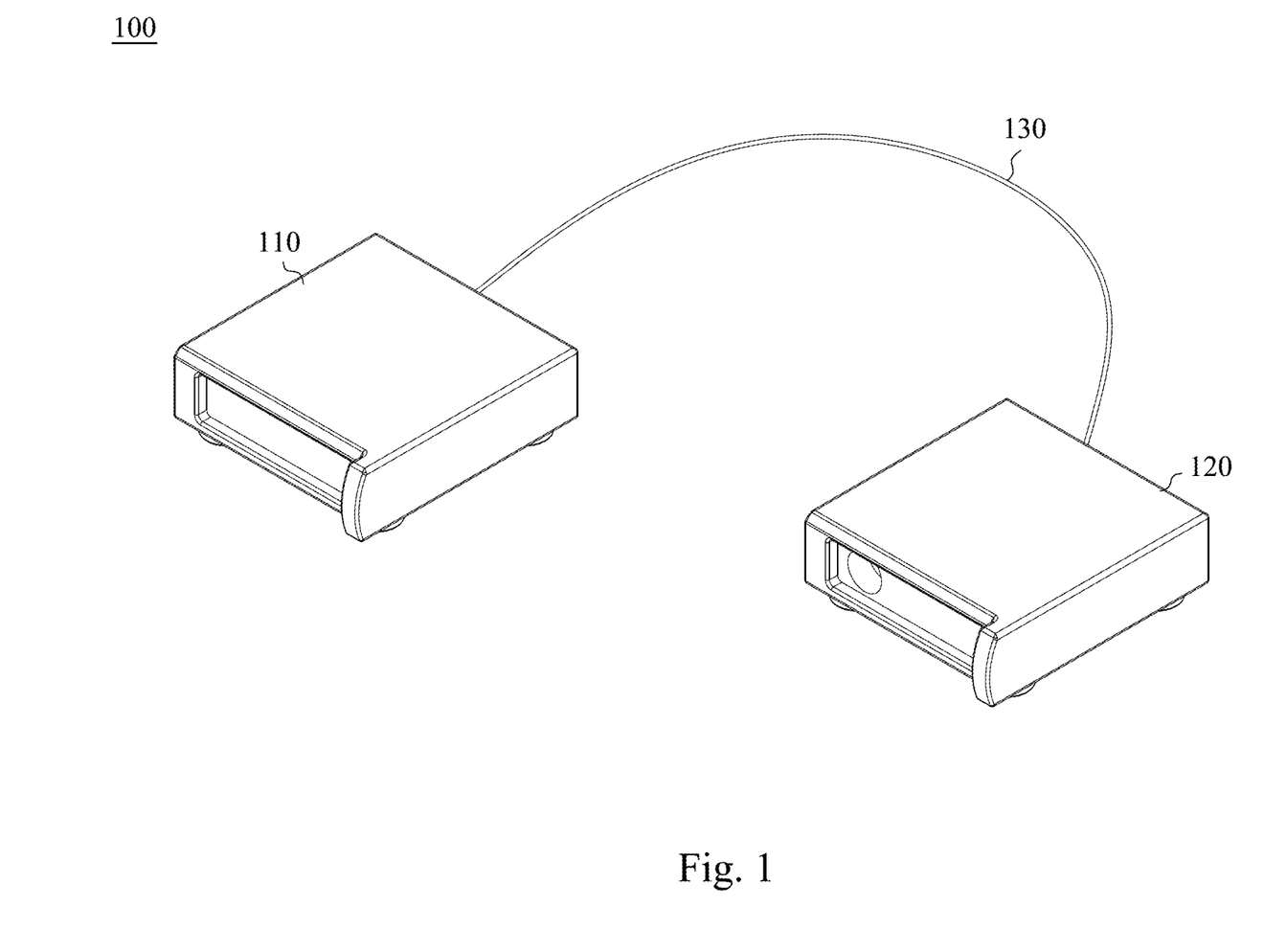
FIG. 1 is a schematic of a projection device according to one embodiment of the present disclosure.
Figure 2:
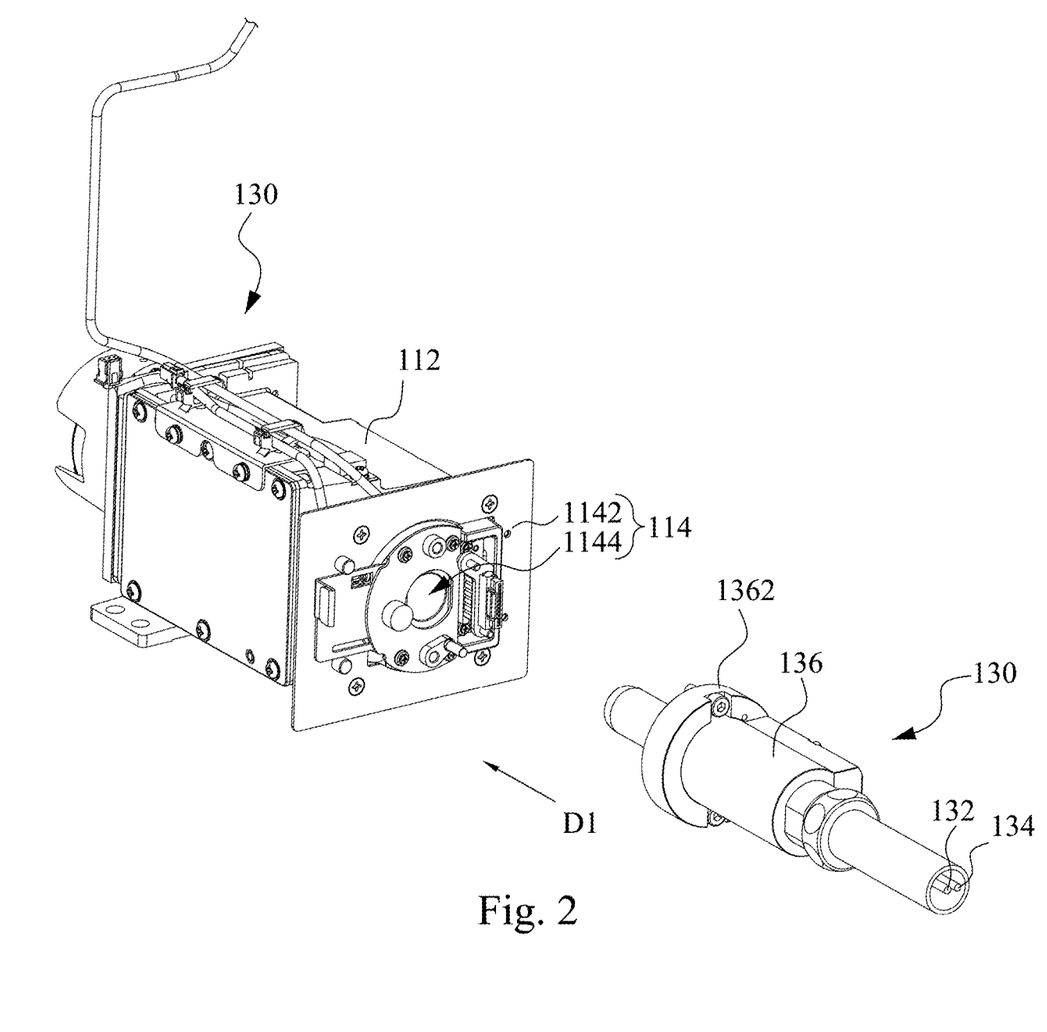
FIG. 2 is a partially enlarged view of the light source module and the optical fiber mounting mechanism in FIG. 1.

FIG. 1 is a schematic of a projection device 100 according to one embodiment of the present disclosure. The projection device 100 includes a light source module 110, a projection module 120, and an optical fiber mounting mechanism 130. FIG. 2 is a partially enlarged view of the light source module 110 and the optical fiber mounting mechanism 130 in FIG. 1. Reference is made to FIG. 1 and FIG. 2. The light source module 110 includes a body 112 and a butting portion 114. The projection module 120 includes a body and a butting portion (not shown) similar to those of the light source module 110. The optical fiber mounting mechanism 130 includes an optical fiber 132, a signal circuit 134, and a mounting structure 136. The optical fiber mounting mechanism 130 is connected with the butting portion 114 of the light source module 110 and the butting portion of the projection module 120 through the mounting structure 136.

Figure 3:
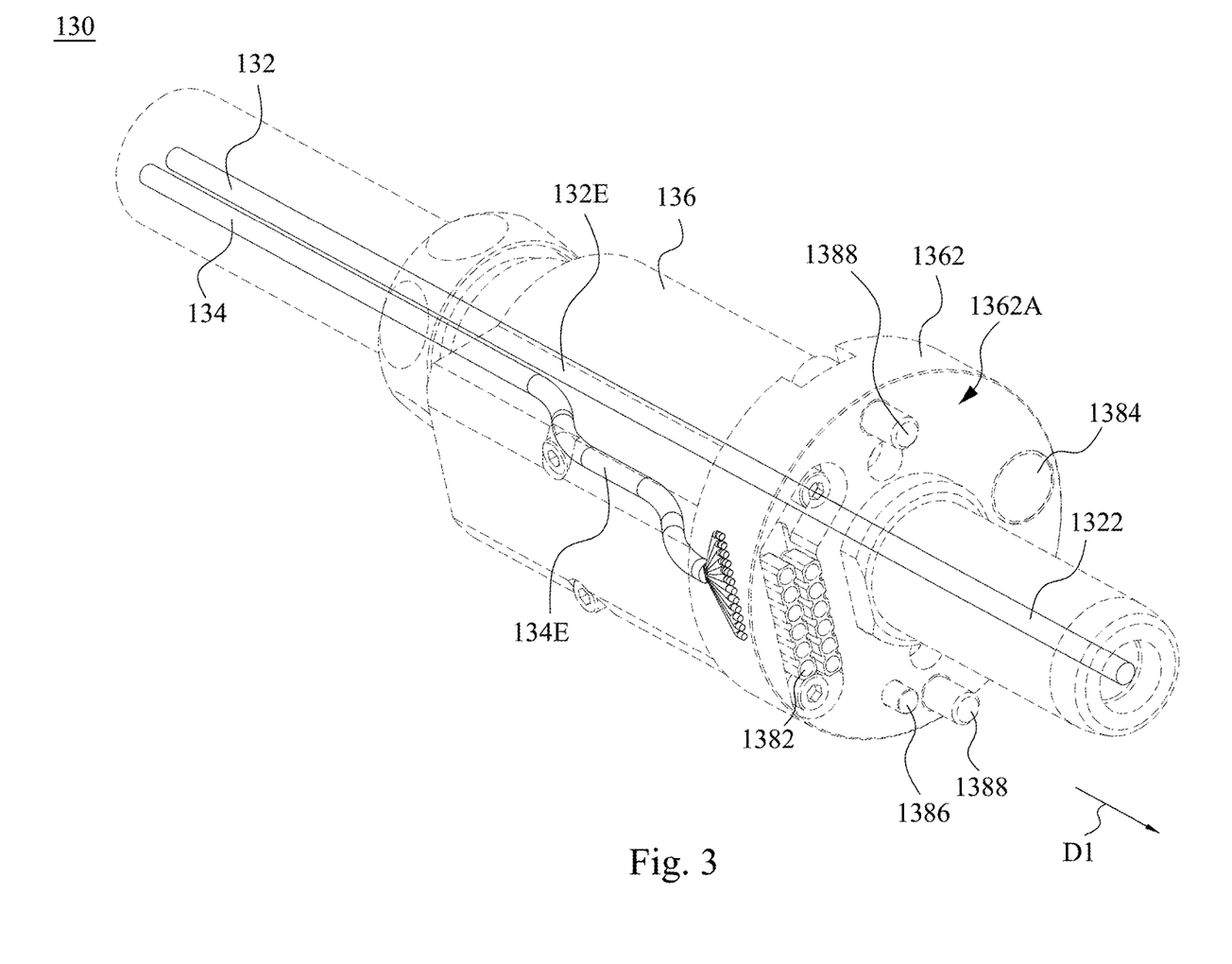
FIG. 3 is a schematic of the optical fiber mounting mechanism in FIG. 1.

FIG. 3 is a schematic of the optical fiber mounting mechanism 130 in FIG. 1. Reference is made to FIG. 2 and FIG. 3. Only the light source module 110 and the mounting structure 136 close to the light source module 110 are demonstrated in FIG. 2 for description, and the optical fiber mounting mechanism 130 has the same structure disposed at a side connecting with the projection module 120. The optical fiber 132 and the signal circuit 134 extend along a first direction D1. The mounting structure 136 is disposed at opposite two ends of the optical fiber 132 and the signal circuit 134. That is, the two ends of the optical fiber 132 and the signal circuit 134 close to the light source module 110 and the projection module 120. Only the ends 132E, 134E close to the light source module 110 are illustrated in FIG. 2. The mounting structure 136 surrounds the optical fiber 132 and the signal circuit 134. The mounting structure 136 has an installation portion 1362 extending radially relative to the first direction D1 as an axis direction. The installation portion 1362 includes a plurality of elements exposed from a surface 1362A of the installation portion 1362, and the surface 1362A includes a normal direction parallel with the first direction D1. In other words, the surface 1362A of the installation portion 1362 has a greater area such that multiple elements can be disposed thereon. The elements may configured to transmit signal, prevent light leakage, and prevent mounting mismatch when the optical fiber mounting mechanism 130 is about to be mounted with the light source module 110 and the projection module 120.

The elements of the installation portion 1362 include a plurality of signal contacts 1382, a magnetic element 1384, a positioning structure 1386, and a locking element 1388. The signal contacts 1382 are connected with the signal circuit 134, and the signal contacts 1382 extend along the first direction D1 and protrude from the surface 1362A. The magnetic element 1384, for example, can be magnet. The magnetic element 1384 is embedded in the installation portion 1362, and the magnetic element 1384 has an outer surface exposed from the surface 1362A of the installation portion 1362. In addition, the outer surface of the magnetic element 1384 is substantially parallel with the surface 1362A of the installation portion 1362. The positioning structure 1386 of the installation portion 1362 protrudes from the surface 1362A of the installation portion 1362 along the first direction D1. For example, the positioning structure 1386 can be a positioning pillar. The locking element 1388 of the installation portion 1362 penetrates the installation portion 1362 along the first direction D1 and protrudes from the surface 1362A of the installation portion 1362. For example, the blocking element 1388 can be a screw.

Figure 4:
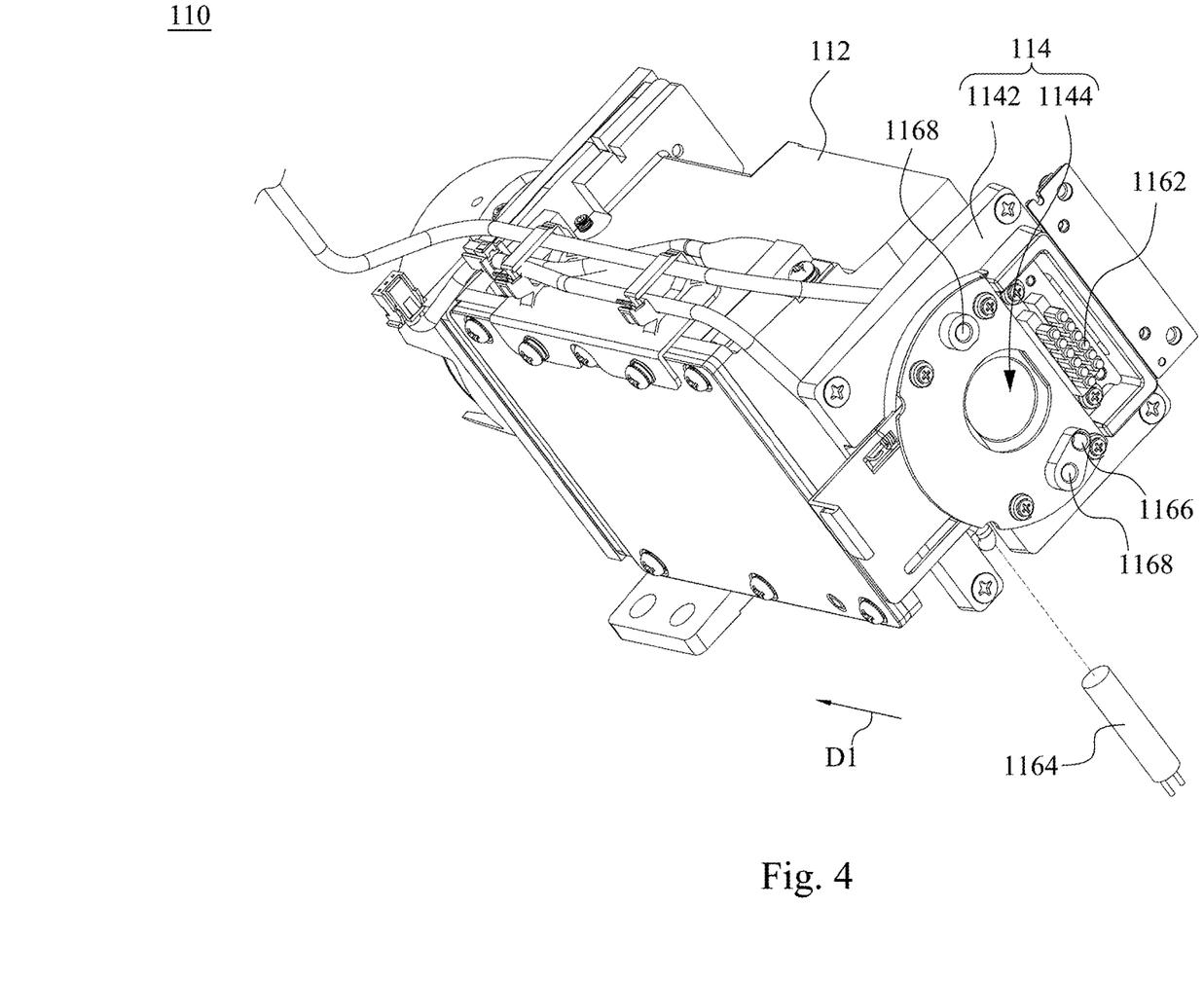
FIG. 4 is a schematic of the light source module in FIG. 1.

FIG. 4 is a schematic of the light source module 110. The butting portion 114 of the light source module 110 includes a plate 1142 and a receiving chamber 1144. The plate 1142 extends radially relative to the first direction D1 as an axis direction, and the receiving chamber 1144 is recessed along the first direction D1. The optical fiber 132 includes an engaging section 1322 protruding from the surface 1362A of the installation portion 1362, and the engaging section 1322 is configured to engage with the receiving chamber 1144 of the butting portion 114. After the installation portion 1362 is engaged with the butting portion 114, the surface 1362A of the installation portion 1362 and the outer surface of the magnetic element 1384 are in contact with the plate 1142 of the butting portion 114. Since the area of the plate 1142 is greater, the plate 1142 can block the installation portion 1362 so as to increase the engagement stability between the installation portion 1362 and the butting portion 114.

The multiple elements disposed on the plate 1142 of the butting portion 114 include contacts 1162, a magnetic sensing switch 1164, a positioning structure 1166, and a blocking hole 1168. The contacts 1162 are configured to be electrically connected with the signal contacts 1382. In other words, the installation portion 1362 and the butting portion 114 are engaged by contact method so as to electrically connect the optical fiber mounting mechanism 130 and the light source module 110 and electrically connect the optical fiber mounting mechanism 130 and the projection module 120. When the light source module 110 and the projection module 120 are electrically connected with each other, the engaging section 1322 of the optical fiber 132 and the receiving chamber 1144 of the light source module 110 mate. That is, the light source module 110 and the optical fiber mounting mechanism 130 are mounted along an extending direction of the optical fiber 132, and the projection module 120 and the optical fiber mounting mechanism 130 are mounted along an extending direction of the optical fiber 132.

The magnetic sensing switch 1164 of the butting portion 114 and the magnetic element 1384 of the installation portion 1362 are magnetically connected. When the light source module 110 and the projection module 120 are respectively mounted with the optical fiber mounting mechanism 130, the electrical connection between the contacts 1162 and the signal contacts 1382 by contact method and the electrical connection between the magnetic sensing switch 1164 and the magnetic element 1384 by non-contact method collectively form an adjustable linkage switch for turning on or tuning off the light source. The mechanism of the aforesaid linkage switch will be described in the following paragraphs.

The positioning structure 1166 of the butting portion 114 is configured to mate with the positioning structure 1386 of the installation portion 1362. For example, the positioning structure 1166 can be positioning through hole and is configured to receive the positioning pillar. In addition, a length of the positioning structure 1386 on the installation portion 1362 protruded along the first direction is greater than a length of the signal contacts 1382. Therefore, before the contacts 1162 and the signal contacts 1382 are in contact with each other, the mutual mate between the positioning through hole and the positioning pillar may prevent the rotational misalignment between the butting portion 114 and the installation portion 1362. As such, the contacts 1162 and the signal contacts 1382 can be prevented from damage. In other embodiments, the positioning structures 1166, 1386 may be other structure with positioning ability, and the present disclosure is not limited in these regards.

The blocking hole 1168 of the butting portion 114 is configured to connect with the blocking element 1388 of the installation portion 1362 such that the butting portion 114 and the installation portion 1362 can be fixed relatively. For example, the blocking hole can be the screw holes for mating with the screws. In other embodiments, the blocking element 1388 and the blocking hole 1168 can be other structures with fixing ability, and the present disclosure is not limited in these regards.

Figure 5:
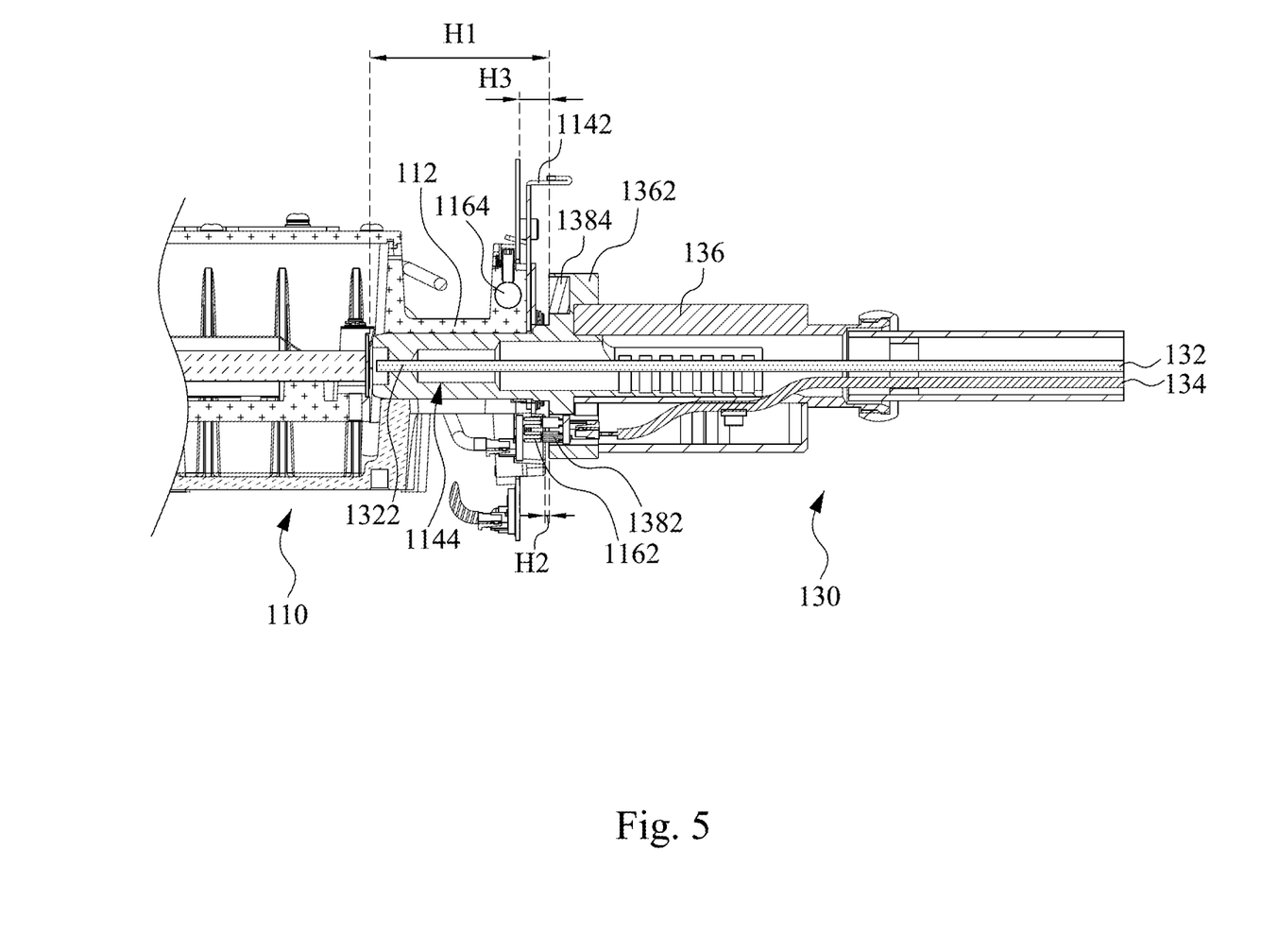
FIG. 5 is a cross-sectional view when the light source module and the optical fiber mounting mechanism in FIG. 2 are mounted.

FIG. 5 is a cross-sectional view when the light source module 110 and the optical fiber mounting mechanism 130 in FIG. 2 are mounted. The receiving chamber 1144 has a depth H1, and the signal contacts 1382 and the contacts 1162 have an effective contact distance H2 therebetween. The depth H1 of the receiving chamber 1144 is greater than the effective contact distance H2 between the signal contacts 1382 and the contacts 1162. In other words, the length of the engaging section 1322 is equal to the depth H1 of the receiving chamber 1144, and the length of the engaging section 1322 is also equal to the effective contact distance H2 between the signal contacts 1382 and the contacts 1162. In some embodiments, the depth H1 is in a range from about 42 mm to 44 mm. In some embodiments, the effective contact distance H2 is in a range from about 0.7 mm to 0.9 mm, and the preferred effective contact distance H2 is 0.8 mm.

The magnetic sensing switch 1164 and the magnetic element 1384 have an effective sensing distance H3 therebetween. The depth H1 of the receiving chamber 1144 is greater than the effective sensing distance H3 between magnetic sensing switch 1164 and the magnetic element 1384. In other words, the length of the engaging section 1322 is greater than the effective sensing distance H3 between magnetic sensing switch 1164 and the magnetic element 1384. In some embodiments, the effective sensing distance H3 is smaller than 20 mm, and the preferred effective sensing distance H3 is in a range from about 6 mm to 7 mm.

Figure 6:
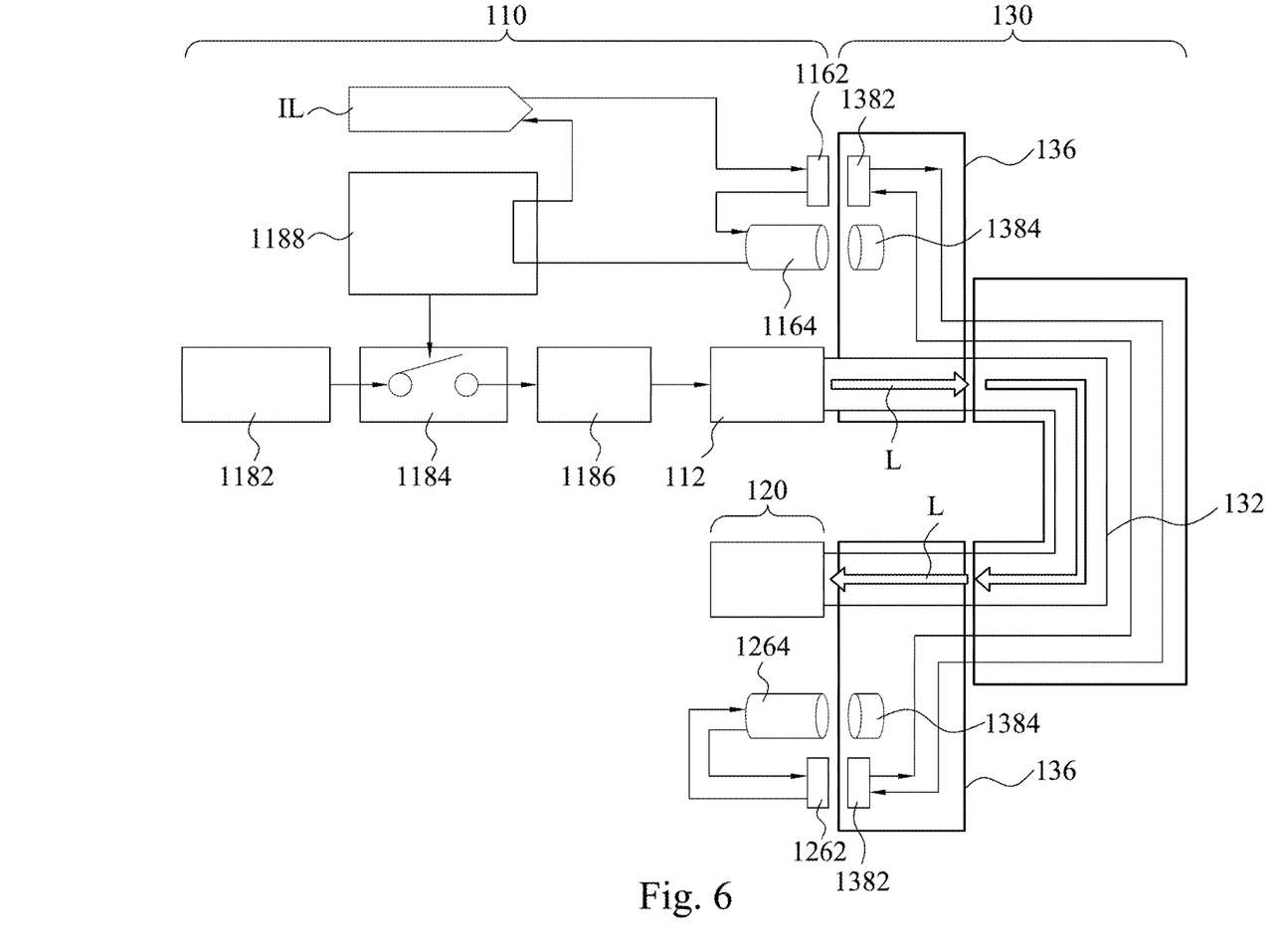
FIG. 6 is an electrical connection schematic of the projection device according to one embodiment of the present disclosure.

FIG. 6 is an electrical connection schematic of the projection device 100 according to one embodiment of the present disclosure. The contacts 1162 of the light source module 110 are electrically connected with the magnetic sensing switch 1164, and the contacts 1262 of the projection module 120 are electrically connected with the magnetic sensing switch 1264. The signal contacts 1382 of the mounting structure 136 at two ends of the optical fiber mounting mechanism 130 are electrically connected with each other. The light source module 110 further includes a power supply unit 1182, a power switch 1184, a light source driving unit 1186, and a sensing circuit 1188. The power switch 1184 is electrically connected with the power supply unit 1182 and the light source driving unit 1186, and the power switch 1184 is electrically connected with the contacts 1162 and the magnetic sensing switch 1164 of the light source module 110 through the sensing circuit 1188.

When the contacts 1162 of the light source module 110 (and the contacts 1262 of the projection module 120) and the signal contacts 1382 are electrically connected and when the magnetic sensing switch 1164 of the light source module 110 (and the magnetic sensing switch 1264 of the projection module 120) and the magnetic element 1384 are electrically connected, a switch control loop IL is opened such that the sensing circuit 1188 may transmit a signal to turn on the power switch 1184. At the same time, the power supply unit 1182 may supply power to the light source driving unit 1186. The body 112 of the light source module 110 emits a light L, and the light L may be transmitted to the projection module 120 through the optical fiber mounting mechanism 130.

Reference is made to FIG. 5 and FIG. 6. Since the depth H1 of the receiving chamber 1144 (that is the length of the engaging section 1322) is greater than the effective contact distance H2 and the effective sensing distance H3, it is guaranteed that the engaging section 1322 of the optical fiber 132 of the optical fiber mounting mechanism 130 has been mounted in the receiving chamber 1144 when the power supply unit 1182 supplies power. In other words, before the distance between the contacts 1162 and the signal contacts 1382 is reduced to the effective contact distance H2, the engaging section 1322 has been in the receiving chamber 1144 such that no light L will be leaked to cause damage. Similarly, before the distance between the magnetic sensing switch 1164 and the magnetic element 1384 is reduced to the effective sensing distance H3, the engaging section 1322 has been in the receiving chamber 1144 such that no light L will be leaked to cause damage.

In other words, during the process of moving the optical fiber mounting mechanism 130 from the light source module 110, a portion of the engaging section 1322 is in the receiving chamber 1144 when the distance between the contacts 1162 and the signal contacts 1382 is greater than the effective contact distance H2. Similarly, during the process of moving the optical fiber mounting mechanism 130 from the light source module 110, a portion of the engaging section 1322 is in the receiving chamber 1144 when the distance between the magnetic sensing switch 1164 and the magnetic element 1384 is greater than the effective sensing distance H3. Therefore, it is guaranteed that the switch control loop IL is closed before the optical fiber mounting mechanism 130 is completely removed from the light source module 110 such that the sensing circuit 1188 may transmit signal to turn off the power switch 1184. As such, no light L will be leaked to cause damage before the optical fiber mounting mechanism 130 is completely removed from the light source module 110.

Figure 7:
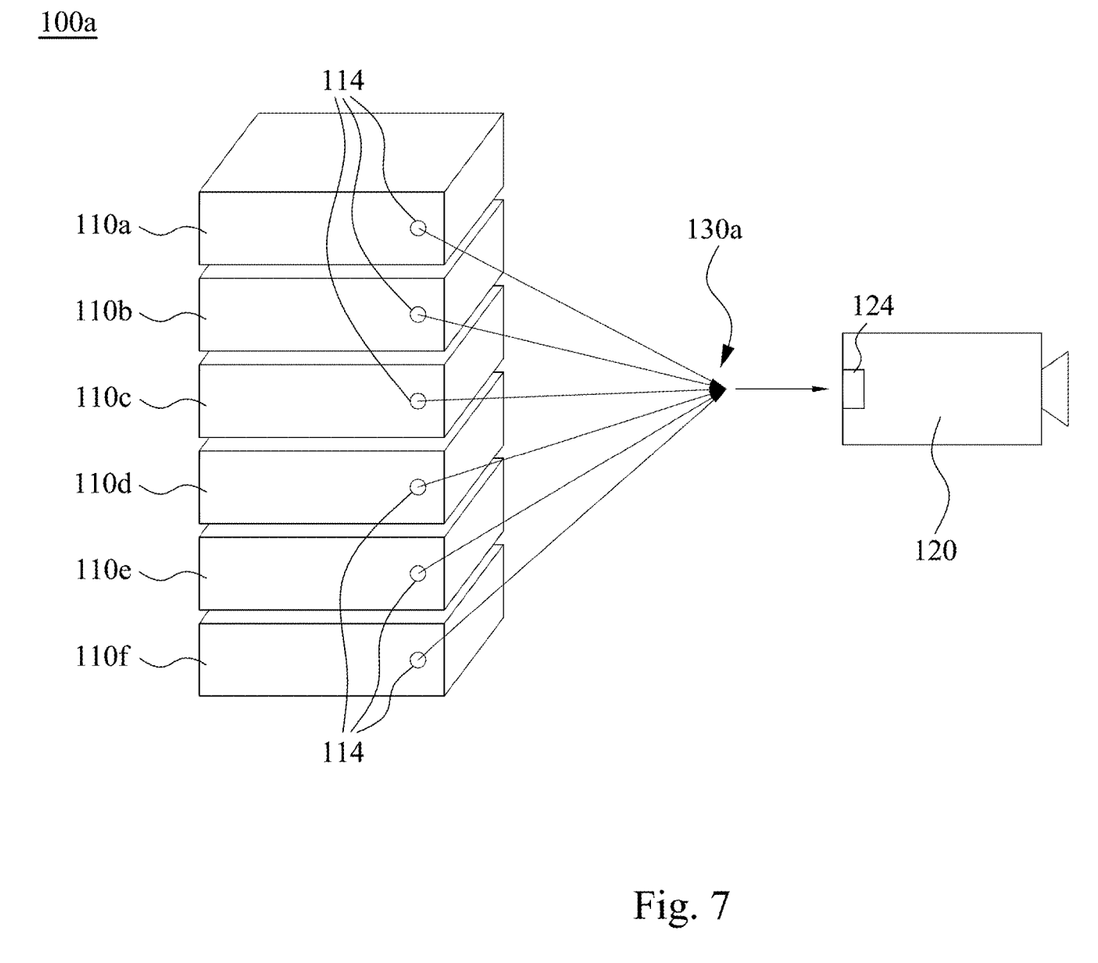
FIG. 7 is a schematic of a projection device according to another embodiment of the present disclosure.

FIG. 7 is a schematic of a projection device 100a according to another embodiment of the present disclosure. The projection device 100a is similarly to the projection device 100 as shown in FIG. 1, and the difference is that the projection device 100a includes multiple light source modules 110a, 110b, 110c, 110d, 110e, 110f. The optical fiber mounting mechanism 130a of the projection device 100a has multiple mounting structures (not shown) corresponding to the light source modules 110a-110f. The optical fiber mounting mechanism 130a can be used with, for example, an optical coupler, a homogenizer, etc., so as to couple the light and to transmit the light to the butting potion 124 corresponding to the projection module 120. The projection device 100a has the same advantages as those of the projection device 100 as shown in FIG. 1, and the description is not repeated hereinafter.

Figure 8:
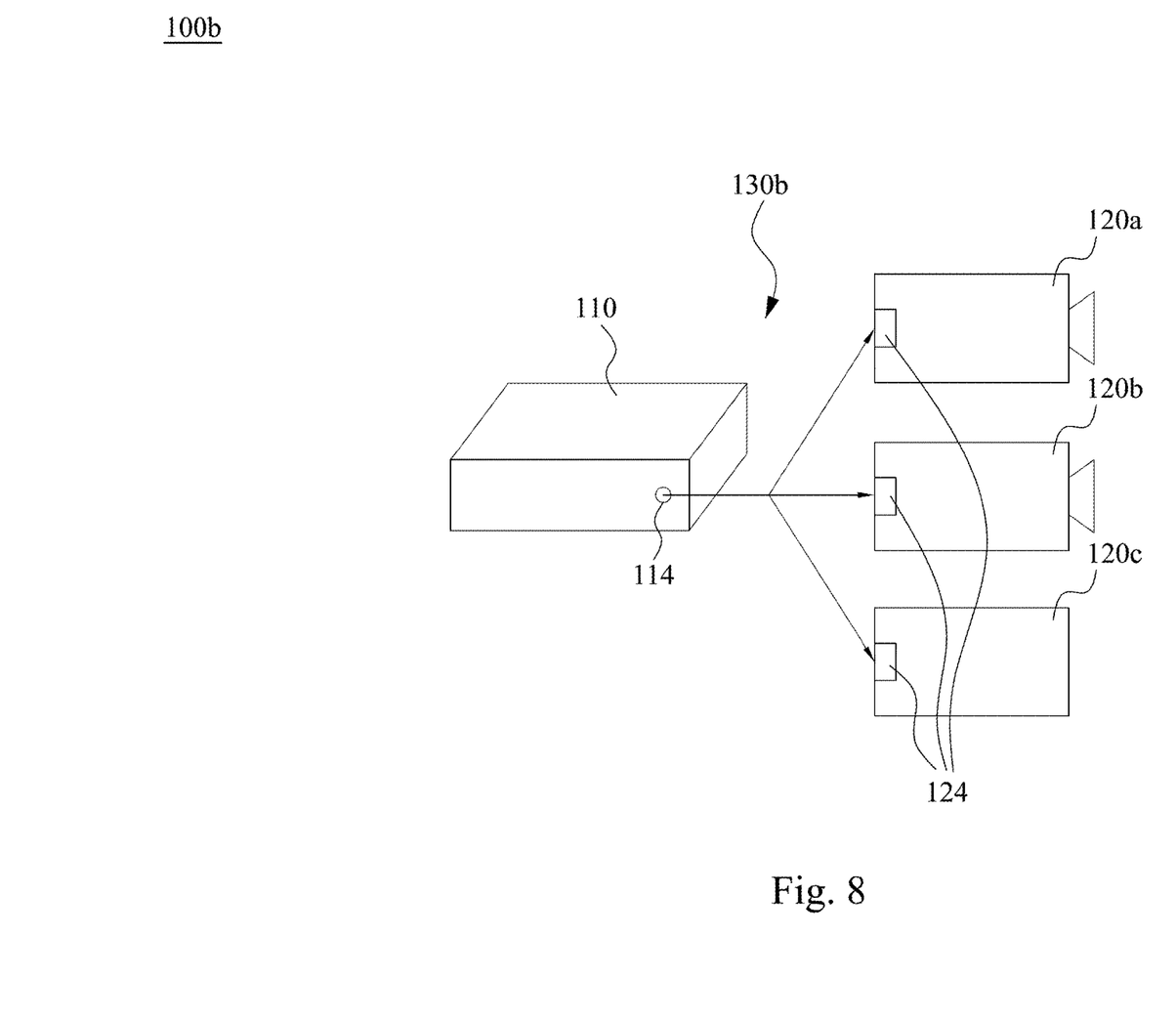
FIG. 8 is a schematic of a projection device according to another embodiment of the present disclosure.

FIG. 8 is a schematic of a projection device according to another embodiment of the present disclosure. The projection device 100b is similarly to the projection device 100 as shown in FIG. 1, and the difference is that the projection device 100b includes multiple projection modulus 120a, 120b, 120c. The optical fiber mounting mechanism 130b of the projection device 100b has multiple mounting structures (not shown) corresponding to the projection modules 120a-120c. The optical fiber mounting mechanism 130b can be used with, for example, an optical coupler, a homogenizer, etc., so as to couple the light and to transmit the light to the butting potion 124 corresponding to the projection modules 120a-120c. The projection device 100b has the same advantages as those of the projection device 100 as shown in FIG. 1, and the description is not repeated hereinafter.

Figure 9:
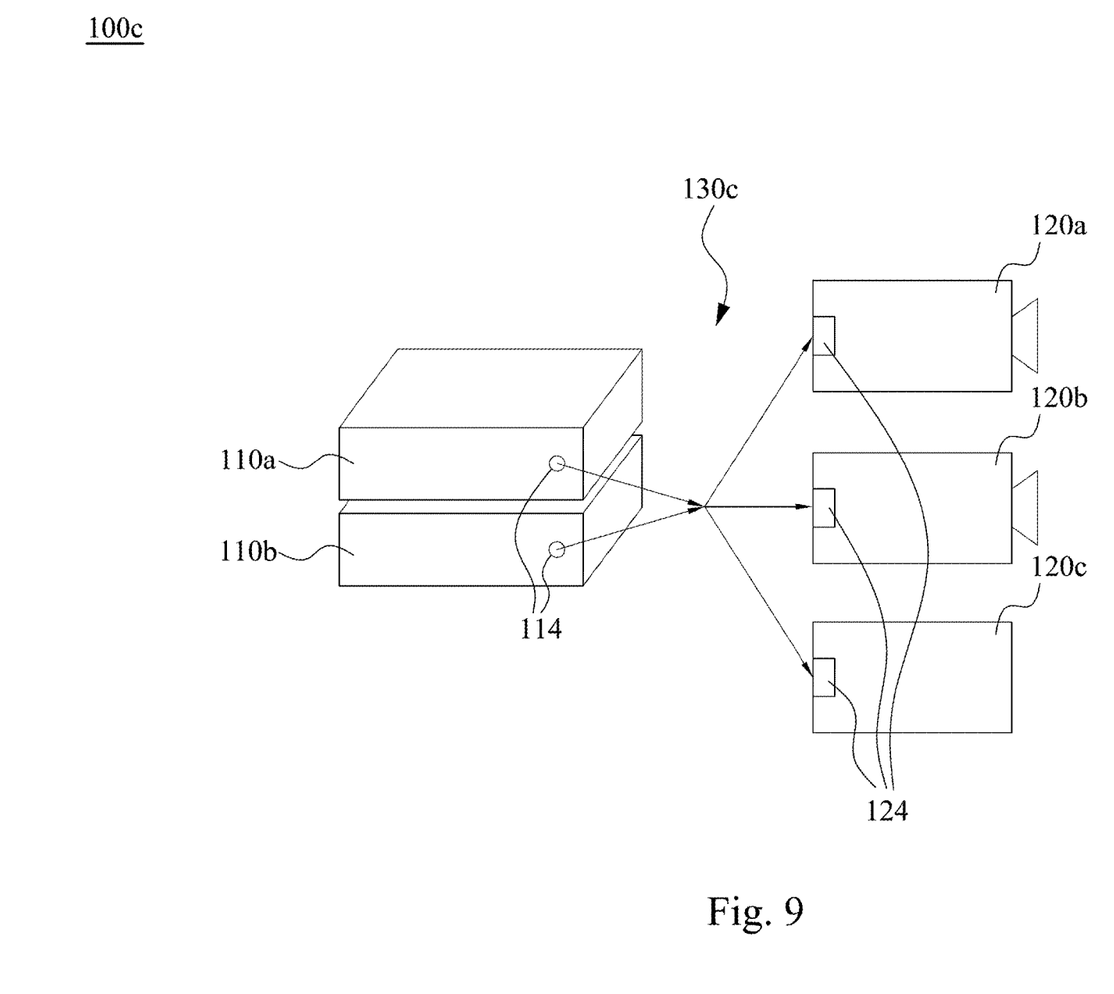
FIG. 9 is a schematic of a projection device according to another embodiment of the present disclosure.

FIG. 9 is a schematic of a projection device 100c according to another embodiment of the present disclosure. The projection device 100c is similarly to the projection device 100 as shown in FIG. 1, and the difference is that the projection device 100c includes multiple light source modules 110a, 110b and multiple projection modulus 120a, 120b, 120c. The optical fiber mounting mechanism 130c of the projection device 100c has multiple mounting structures (not shown) corresponding to the butting portion 114 of the light source modules 110a, 110b and multiple mounting structures (not shown) corresponding to the butting portion 124 of the projection modules 120a-120c. The optical fiber mounting mechanism 130c can be used with, for example, an optical coupler, a homogenizer, etc., so as to couple the light and to transmit the light to the projection modules 120a-120c from the light source modules 110a, 110b. The projection device 100c has the same advantages as those of the projection device 100 as shown in FIG. 1, and the description is not repeated hereinafter.

Figure 10:
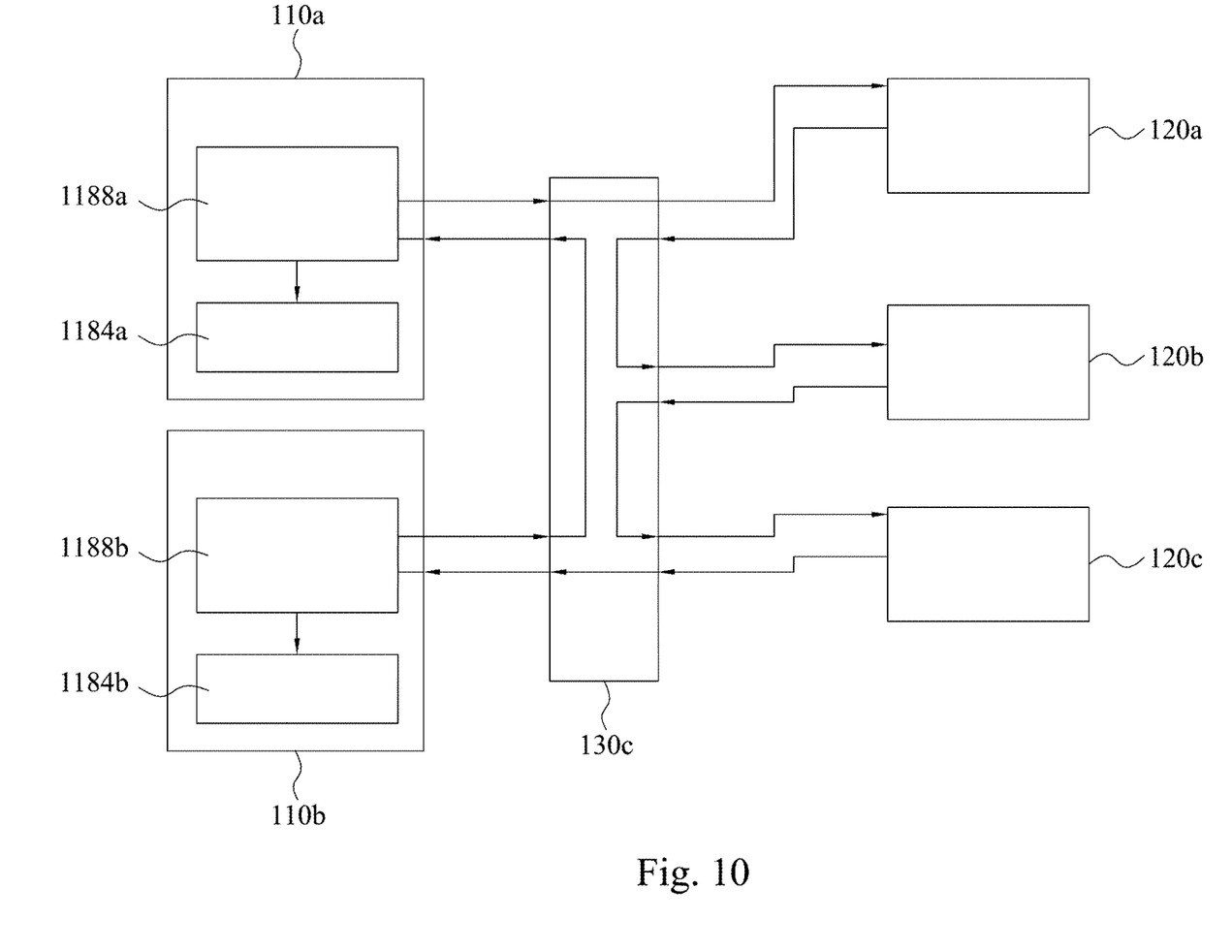
FIG. 10 is an electrical connection schematic of the projection device in FIG. 9.

FIG. 10 is an electrical connection schematic of the projection device in FIG. 9. The sensing circuit 1188a of the light source module 110a and the sensing circuit 1188b of the light source module 110b of the projection device 110c are electrically connected. The sensing circuit 1188a of the light source module 110a is electrically connected with the projection module 120a, and the sensing circuit 1188b of the light source module 110b is electrically connected with the projection module 120c. The optical fiber mounting mechanism 130c has multiple signal circuits 134 electrically connected that are correspond to the multiple projection modules 120a-120c. When the optical fiber mounting mechanism 130c are connected with the light source modules 110a, 110b and the projection modules 120a-120c, as long as one of the aforesaid electrical connection is not satisfied, the sensing circuits 1188a, 1188b will transmit signals to turn off the power switch 1184a, 1184b.

In summary, the optical fiber mounting mechanism of the present disclosure may guarantee that the power switch has been turned off before the optical fiber mounting mechanism is completely removed from the receiving chamber by making the depth of the receiving chamber (or the length of the engaging section of the optical fiber) greater than the effective contact distance between the signal contacts and the contacts and/or the effective sensing distance between the magnetic sensing switch and the magnetic element. Similarly, since the depth of the receiving chamber is greater than the effective contact distance between the signal contacts and the contacts and/or the effective sensing distance between the magnetic sensing switch and the magnetic element, it is guaranteed that the power switch has been turned off before the optical fiber mounting mechanism is completely removed from the receiving chamber. As such, no light will be leaked to cause damage.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical fiber mounting mechanism, comprising:
   an optical fiber extending along a first direction, wherein the optical fiber comprises an engaging section;
   a signal circuit extending along the first direction; and
   a mounting structure disposed at ends of the optical fiber and the signal circuit, wherein the mounting structure surrounds the optical fiber and the signal circuit, the mounting structure comprises an installation portion extending radially relative to the first direction as an axis direction, the installation portion comprises a plurality of elements exposed from a surface of the installation portion, and the surface comprises a normal direction parallel with the first direction, the elements of the installation portion comprise a plurality of signal contacts connecting with the signal circuit, the signal contacts extend along the first direction, and a first length of the engaging section of the optical fiber protruding from the surface of the installation portion is longer than a second length of the signal contacts protruding from the surface of the installation portion.

2. The optical fiber mounting mechanism of claim 1, wherein the elements of the installation portion comprise a magnetic element.

3. The optical fiber mounting mechanism of claim 1, wherein the elements of the installation portion comprise a positioning structure protruding from the installation portion along the first direction.

4. The optical fiber mounting mechanism of claim 1, wherein the elements of the mounting structure comprise a locking element penetrates the installation portion along the first direction and protruding from the surface of the installation portion.

5. The optical fiber mounting mechanism of claim 1 is applied to a projection device, wherein the projection device comprising:
    another optical fiber mounting mechanism, comprising:
    an optical fiber extending along a first direction;
    a signal circuit extending along the first direction; and
    a mounting structure disposed at ends of the optical fiber and the signal circuit, wherein the mounting structure surrounds the optical fiber and the signal circuit, the mounting structure comprises an installation portion extending radially relative to the first direction as an axis direction, the installation portion comprises a plurality of elements exposed from a surface of the installation portion, and the surface comprises a normal direction parallel with the first direction;
    at least one light source module comprising a butting portion, wherein the butting portion is configured to butt with an installation portion of one of the optical fiber mounting mechanisms along the first direction; and
    at least one projection module comprising a butting portion, wherein the butting portion is configured to butt with an installation portion of another one of the optical fiber mounting mechanisms along the first direction.

6. The optical fiber mounting mechanism of claim 5, wherein each of the butting portions comprises a plate and a receiving chamber, the plate extends radially relative to the first direction as an axis direction, and the receiving chamber is recessed along the first direction.

7. The optical fiber mounting mechanism of claim 6, wherein the elements of each of the installation portion comprise a plurality of signal contacts connecting with the signal circuit of each of the installation portion, each of the butting portions comprise a plurality of contacts, and the contacts are configured to be electrically connected with the signal contacts along the first direction, and a depth of the receiving chamber is greater than an effective contact distance between the contacts and the signal contacts.

8. The optical fiber mounting mechanism of claim 6, wherein the elements of each of the installation portion comprise a magnetic element, each of the butting portions comprises a magnetic sensing switch, the magnetic sensing switches are configured to connect with the magnetic elements along the first direction, and a depth of the receiving chamber is greater than an effective sensing distance between the magnetic sensing switches and the magnetic elements.

9. The optical fiber mounting mechanism of claim 7, wherein each of the butting portions comprises a plurality of signal contacts and a magnetic sensing switch, and the contacts are electrically connected with the magnetic sensing switch of each of the butting portions.

10. The optical fiber mounting mechanism of claim 5, wherein the elements of each of the installation portion comprise a positioning structure, each of the butting portions comprises a positioning structure, and the positioning structure of the butting portion and the positioning structure of the installation portion are configured to mate along the first direction.

11. The optical fiber mounting mechanism claim 5, wherein the elements of each of the installation portion comprise a locking element, each of the butting portions comprises a locking hole, and the locking hole of the butting portion is configured to connect with the locking element of the installation portion along the first direction.

12. The optical fiber mounting mechanism of claim 5, wherein a number of the light source module is plural.

13. The optical fiber mounting mechanism of claim 5, wherein a number of the projection module is plural.

14. The optical fiber mounting mechanism of claim 5, wherein a number of the light source module is plural, and a number of the projection module is plural.

* * * * *